Oct. 8, 1929.                    B. ROSENBAUM                         1,730,534
                       COMBINED HOT AND COLD WATER VALVE
                              Filed July 1, 1925              2 Sheets-Sheet 1
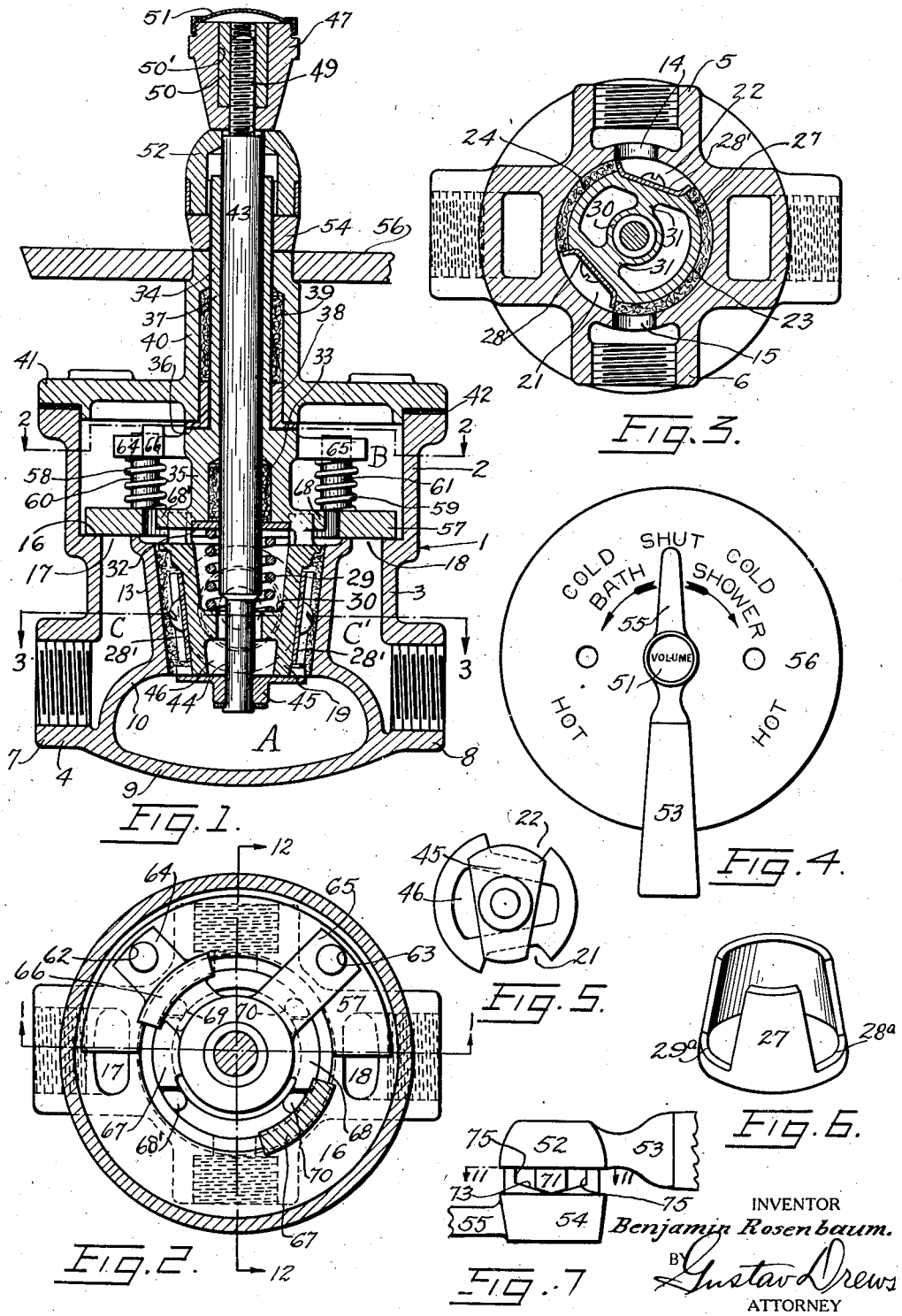

Oct. 8, 1929.   B. ROSENBAUM   1,730,534
COMBINED HOT AND COLD WATER VALVE
Filed July 1, 1925   2 Sheets-Sheet 2

INVENTOR
Benjamin Rosenbaum,
BY Gustav Drews
ATTORNEY

Patented Oct. 8, 1929

1,730,534

UNITED STATES PATENT OFFICE

BENJAMIN ROSENBAUM, OF BRONX, NEW YORK

COMBINED HOT AND COLD WATER VALVE

Application filed July 1, 1925. Serial No. 40,742.

This invention relates to valves in general and more especially to improvements in combined hot and cold water valves.

Among the objects of the present invention, it is aimed to provide in a combined hot and cold water valve an improved control, whereby the main valve will be liberated from its valve seat preparatory to actuation to prevent binding, and thus positioned for ready actuation.

It is also aimed to provide an improved volume control for a combined hot and cold water valve of the character here described which valve will not require the use of springs and other yieldable material for forming a yieldable seat.

In valves intended for use with mediums of varying temperature, numerous springs and yieldable means are generally used to prevent binding, and at the same time prevent leakage. In the present construction, it is an object to use the least number of springs and yieldable means, and in such a manner to arrange the several active parts, that any leakage that may result between the several active parts, will be so controlled that a predetermined mixture can readily be obtained, and whereby the outlets can simultaneously be effectively shut off without danger of any leakage.

Among other objects, the present invention also aims to produce a valve construction whereby a maximum efficiency can be obtained with a minimum number of parts, and which construction can be manufactured at a minimum cost, and be readily assembled and installed by the average unskilled workman.

These and other features, advantages and capabilities of the invention will appear from the subjoined detailed description of the accompanying drawings, in which Figure 1 is an axial section of the valve with parts thereof broken away.

Fig. 2 is a transverse section on the line 2—2 of Fig. 1.

Fig. 3 is a transverse section on the line 3—3 of Fig. 1, with the valve slightly turned relative to the position indicated in Fig. 1.

Fig. 4 is a plan showing the parts of the valve that are visible when the device is installed.

Fig. 5 is a bottom plan showing the volume control in detail.

Fig. 6 is a perspective showing the valve packing inverted relative to the position illustrated in Fig. 1.

Fig. 7 is a fragmental side elevation, with parts of the lever and pointer broken away, and illustrating the valve liberating cams.

Figure 8:
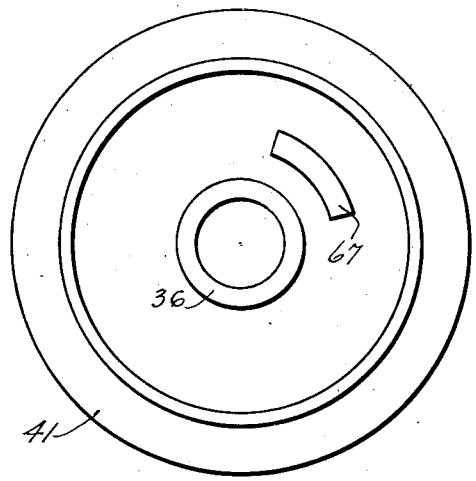
Fig. 8 is a bottom plan of the cover removed.
Figure 9:
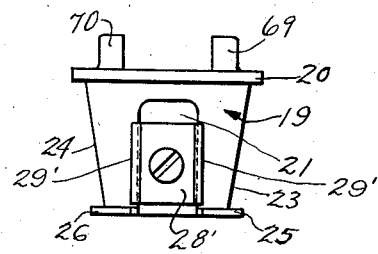
Fig. 9 is a side elevation of the main valve casting removed.

In the embodiment illustrated, there is shown a main casing 1, having an upper cylindrical wall member 2, an intermediate cross-shaped wall member 3, and a lower cross-shaped wall member 4. The intermediate wall member 3 has a plurality of extensions, four in the present instance, that are formed in pairs substantially diametrically opposite to one another, one pair forming the nipples 5 and 6 to serve as inlets, and the other pair continuing down into the lower wall member 4 to form the nipples 7 and 8 which will serve as outlets.

The bottom 9 of the casing forms with the anular inner wall member 10 the mixing chamber A for the valve. The wall 10 separates the mixing chamber A from the passages C and C', leading to the outlets 7 and 8 and extends upwardly to form the downwardly tapering wall member 13 which serves as the valve seat for the main valve member. The wall member 13 has openings 14 and 15 to establish communications between the nipples 5 and 6 and the interior of the valve seat formed by the wall member 13.

Adjacent to the wall member 2 there is formed the annular platform 16, forming with the wall member 2, a closed upper outflow chamber B. The platform 16 has openings 17 and 18 formed therein to communicate with the passages C and C' forming the lower outflow chambers in communication with the nipples 7 and 8 respectively.

Figure 10:
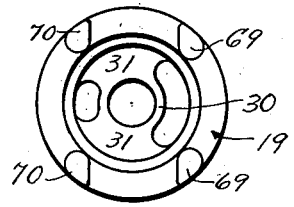
Fig. 10 is a plan of the main valve casting removed.
Figure 11:
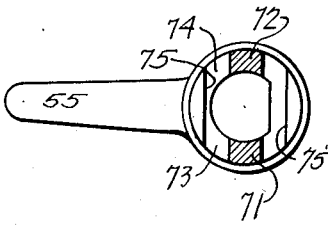
Fig. 11 is a section on the line 11—11 of Fig. 7.
Figure 12:
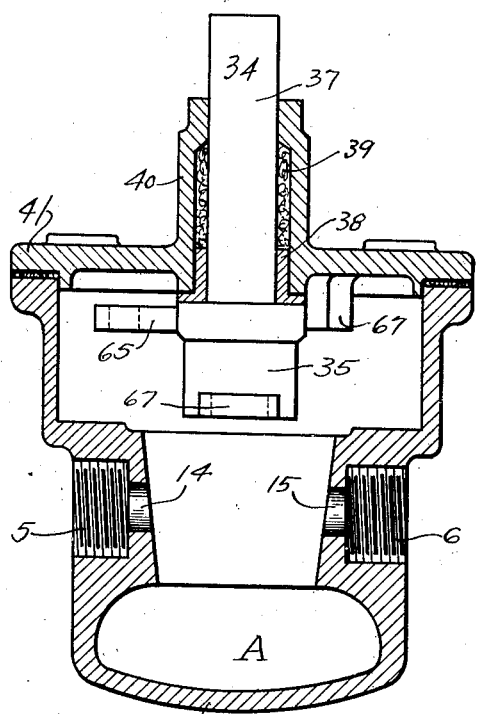
Fig. 12 is a transverse section of the main housing showing the hollow spindle in place.

The main valve member cooperating with the valve seat formed by the wall member 13 consists essentially of a casting 19, see Fig. 10, having an upper continuous annular rim 20, two depressions 21 and 22 at angles relative to one another so as to form an elongated face 23, and a narrow face 24 between them, the lower edges of the faces 23 and 24 having rims 25 and 26 respectively there formed. The rims 20, 25 and 26 primarly form abutments for the packing member 27. The packing member 27 as shown in Fig. 6 has two openings 28$^a$ and 29$^a$ spaced from one another to conform to the spaces between the depressions 21 and 22 so that such openings will register with the depressions 21 and 22 as shown in Fig. 3. The packing member 27 is preferably formed of a suitable waterproof material, such as rubber, rubberized fabric or a suitably treated leather. The material of the packing member 27 preferably also has sufficient elasticity so that when placed on the casting 19, it will cling to the surfaces 23 and 24 and be anchored against accidental displacement by the rims 25 and 26. The depressions as shown in Fig. 3 are preferably covered with suitable metal plates 28', 28' having upturned edges which edges 29', 29' form anchoring flanges with the rims 20, 25 and 26 to anchor the packing 27 against displacement relative to the casting 19, the plates being secured in place by screws or the like. The casting when equipped with the packing 27 will fit snugly in the valve seat formed by the wall member 13 as shown in Fig. 1. The depressions 21 and 22 are positioned relative to one another as shown in Fig. 3 so that at the neutral, or closed position of the valve, the surfaces 24 and 23 will oppose the openings 14 and 15. If the valve is turned counter-clockwise from such neutral position, it will first open the opening 14 as shown in Fig. 3 and as this rotation is continued the opening 15 will also be opened. Similarly, if the valve is turned in clockwise direction, as soon as the opening 14 is exposed, the water will be free to pass from the nipple 5 through the depression 21 into the mixing chamber A, the water being barred from flowing directly into the upper outflow chamber B by means of the rim 20 and the portion of the packing member 27 adjacent to the rim 20. From the mixing chamber A, the water is then caused to pass through the interior of the casting 19 to the upper outflow chamber B. For normally maintaining the main valve member in engagement with the wall member 13, the spring 29 is provided. This spring is tensed between the annular shoulder portion 30 formed on the inner ends of the arms 31, 31 extending from the interior faces of the casting 19, and the washer 32 closing the stuffing box 33 formed in the lower end of the chambered spindle 34.

The chambered spindle 34 preferably has an enlargement 35 at its lower end to house the stuffing box 33 and forms a shoulder 36 with the upper diminished elongated portion 37 of the spindle 34 to receive the flanged collar 38 which closes the stuffing box 39 formed in the upper extension 40 of the cover 41, the collar 38 being secured in place against the cover 41 while the spindle 34 is rotatably mounted in said extension, stuffing box 33 and collar 38 as shown in Fig. 1. The stuffing box 39 aforesaid forms a watertight packing between the extension 40 and the elongated portion 37 of the spindle 34.

The cover member 41 as shown in Fig. 1 engages the upper annular edge of the cylindrical wall member 2 to form the upper closure for the upper outflow chamber B, a suitable packing 42 being disposed between the opposing edges of the cover 41 and the wall member 2. The cover 41 and casing 1 thus constitute the housing for the main valve parts.

Through the chambered spindle 34, stuffing box 33, spring 29, and casting 19, there extends the volume control rod 43, the packing 33 forming a water-tight connection between the rod 43 and the spindle 34. The rod 43 terminates in a diminished lower extension 44 which is spaced from the annular shoulder 30 of the casting 19 as shown in Fig. 1. To the lower end of the extension 44, there is secured the valve plate 45, to cooperate with the lower opening 46 of the central chamber formed through the casting 19. The plate 45 conforms in configuration to the opening 46, but is slightly larger in all dimensions than said opening 46, so that it may effectually close the opening 46 in one position thereof (see the conformations of the opening 46 and plate 45 illustrated in Fig. 5) and in turn as the plate 45 is rotated relative to the opening 46, it will expose the opening 46 a greater or less amount as desired. The plate 45 will be held in intimate engagement with the lower edge of the casting 19, and this is effected by adjustment of the manipulating knob 47. The upper end 49 of the rod 43 is diminished and threaded, to receive the internally screw-threaded portion of the knob 47. In order to lock the knob against rotation on said threaded end 49, a locking sleeve 50 extends into the chambered portion 50' of the knob 47 and is screw-threadedly connected to the diminished end 49 of the rod 43 extending up through said chambered portion 50'. The upper end of the knob 47 is preferably provided with a plate 51, on which there may be inscribed the notation "Volume" to indicate its function to the user. This plate 51 will also serve to give a finish to the upper end of the knob 47 and enclose the sleeve 50.

The proper location of the knob 47 is determined by the hub 52 of the main valve handle 53. This hub 52 rests on the hub 54 of the pointer 55 which in turn rests on the dial 56, and the dial 56 in turn is secured to the upper end of the upper extension 40 of the cover 41.

In order to control the flow of the water from the upper outflow chamber B, either to one of the lower outflow chambers C or C′, or to both, there is provided the valve member 57, in the present instance, the arcuate segment in form extending slightly more than a half of an annulus. This segment 57 is rotatably mounted on the platform 16 and when in neutral position as shown in Fig. 2 only partially closes each of the openings 17 and 18 leading to the chambers C and C′. In order to maintain the arcuate valve 57 in intimate engagement with the valve seat formed by the platform 16 surrounding the openings 17 and 18, the springs 58 and 59 are provided, anchored in place by the pins 60 and 61 extending up from the segment 57 and into the openings 62 and 63 formed in the arms 64 and 65 respectively extending from the enlargement 35 of the spindle 34, the springs being tensed between the arms 64 and 65 and the segment 57. By means of the pins 60 and 61 and their connection with the arms 64 and 65, the segment 57 will be caused to rotate simultaneously with the rotation of the spindle 34.

In order to limit the amount of rotation of the spindle 34 and also of the segment 57, the arm 64 is provided with an arcuate stop member 66 which cooperates with the stop 67 formed on the cover 41 and extending downwardly therefrom.

The connection of the handle 53 with the spindle 34 and its operation will now be described. The hub 52 which is integral with the handle 53, is freely rotatable relative to the rod 43. The hub 54 of the pointer 55, however, is fixedly secured to the spindle 34, and consequently whatever rotation is transmitted to the hub 54 will be in turn transmitted to the spindle 34, and through the arms 64 and 65 to the segment 57.

Due to the variation in temperature, unless provision were made, the main valve embracing the casting 19 might so adhere to the valve seat formed in the wall member 13 as to prevent the ready operation of the same. To guard against such improper operation, the present invention contemplates means for positively liberating the valve from the valve seat before starting the rotative action. To this end, the enlargement 35 of the spindle 34 is provided with two lugs 68 and 68′, the lugs having sufficient dimension to permit the pairs of lugs 69 and 70 respectively of the casting 19 to slide axially, but anchoring the casting 19 against rotation relative to the spindle 34. The casting 19, thus forms with the enlargement 35 and spindle 34 a valve element in which these three constituent parts are rotated together although the casting 19 may be axially movable relative to the enlargement 35.

In order to actuate the casting 19 axially relative to the spindle 34, and thus raise the main valve from its valve seat, the hub 52 of the handle 53 is provided with two cam lugs 71 and 72 which cooperate with the cam faces 73 and 74 respectively of the hub 54 appurtenant to the pointer 55. Consequently as the handle 53, see Fig. 4, is actuated to draw water either for the "bath" or for the "shower" the cam lugs 71 and 72 will first ride up the cams 73 and 74 to raise the knob 47 and thereby raise the main valve from its valve seat, and then upon striking the sides 75 of the cam recesses formed in the hub 54 will begin to rotate the spindle 34 in turn to rotate the segment 57, and also rotate the lugs 67 and 68 in turn to rotate the casting 19 of the main valve.

From the foregoing it will, therefore, appear that when it is desired to draw water for the "bath", the handle 53 is turned in a counterclockwise direction, whereupon the cam lugs 71 and 72 first will cooperate with the cam faces 73 and 74 to withdraw the casting 19 of the main valve out of intimate engagement with the valve seat formed by the wall member 13, and then upon the continued rotation of the handle 53, will engage the faces 75 of the hub 54 in turn to rotate the spindle 34, whereupon the depression 22, see Fig. 3, will register with the opening 14 to permit the cold water, for instance, to enter from the nipple 5 and then pass through the opening 14 and the depression 22 to the mixing chamber A, and upon the further rotation of the handle 53, according to the wishes of the user, the depression 21 will be caused to register with the opening 15, whereupon, for instance, the hot water will be permitted to enter from the nipple 6 and then pass through the opening 15 and the depression 21 to the mixing chamber A. From the mixing chamber A, the water will pass up through the interior of the casting 19 to the upper outflow chamber B, and upon the opening 18 having been fully uncovered, and the opening 17 entirely covered by the arcuate valve 57, the mixed water from the chamber A will be free to pass through the lower outflow chamber C′, to the nipple 8. If the water to be drawn is to be used for the "shower", the handle 53 will merely be turned in the opposite direction, and the water caused to pass through the other set of corresponding openings to the nipple 7. The position of the volume control valve or plate 45 relative to the opening 46 is determined by the position of the knob 47 and will control the volume of water to be drawn.

It is obvious that various changes and modifications may be made to the details of construction without departing from the general spirit of the invention set forth in the appended claims.

It is also, of course, obvious that fluids other than water may be used with this valve, and that the reference to hot and cold water is merely in explanation of one use for the valve constituting the present invention.

I claim:

1. In a valve, the combination with a casing having a mixing chamber, of an outflow chamber, a main valve seat, an inlet control valve rotatably mounted on said seat, there being lateral inlet passages in said inlet control valve leading to said mixing chamber, there being an interior passage in said inlet control valve to afford communication between said mixing chamber and said outflow chamber, a control rod extending through said inlet control valve, and a volume control valve fixed on said rod to control the passage of fluid through said interior passage, said rod being rotatably mounted relative to said inlet control valve and operable to rotate said volume control valve according to the volume of flow required.

2. In a valve, the combination with a casing having a mixing chamber, of an outflow chamber, a main valve seat, an inlet control valve rotatably mounted on said seat, there being lateral inlet passages in said inlet control valve leading to said mixing chamber, there being an interior passage in said inlet control valve to afford communication between said mixing chamber and said outflow chamber, a control rod extending through said inlet control valve, and a valve plate fixed on said rod and controlling the passage of fluid through said interior passage, said rod being rotatably mounted relative to said inlet control valve and operable to rotate said valve plate according to the volume of flow required.

3. In a valve, the combination with a casing having a mixing chamber, of an outflow chamber, a main valve seat, an inlet control valve rotatably mounted on said valve seat, there being lateral inlet passages in said inlet control valve leading to said mixing chamber, there being an interior passage in said inlet control valve to afford communication between said mixing chamber and said outflow chamber, a control rod extending through said inlet control valve, and a valve plate fixed on said rod and controlling the passage of fluid through said interior passage, the lower end of said inlet control valve forming a valve seat for said valve plate, said rod being rotatable relative to said inlet control valve and operable to rotate said valve plate according to the volume of flow required.

4. In a valve, the combination with a housing having a mixing chamber, of a valve seat in said housing, a valve rotatably mounted on said valve seat and controlling the passage of fluid to said mixing chamber, a spindle rotatably mounted in said housing and operatively connected to said valve to rotate the same but permit axial movement of said valve relative to said spindle, and a handle operatively connected to said spindle and to said valve to raise said valve from its valve seat and thereupon rotate said spindle in turn to cause said valve to be rotated.

5. In a valve, the combination with a housing having a mixing chamber, of a valve seat in said housing, a valve rotatably mounted on said valve seat and controlling the passage of fluid to said mixing chamber, a spindle rotatably mounted in said housing and operatively connected to said valve to rotate the same but permit axial movement of said valve relative to said spindle, a handle, cam faces and stops appurtenant to said spindle, and cam lugs on said handle cooperating with said cam faces to raise said valve from its valve seat at one time and at another time cooperating with said stops to rotate said spindle to cause said valve to be rotated.

6. In a valve, the combination with a housing having a mixing chamber, of a valve seat in said housing, a valve rotatably mounted on said valve seat and controlling the passage of fluid to said mixing chamber, a spindle rotatably mounted in said housing and operatively connected to said valve to rotate the same but permit axial movement of said valve relative to said spindle, a handle operatively connected to said spindle and to said valve to raise said valve from its valve seat and thereupon rotate said spindle in turn to cause said valve to be rotated, a fixed stop on said housing, and a second stop on said spindle cooperating with said fixed stop to limit the rotation of said spindle relative to said housing.

7. In a valve, the combination with a casing having a valve seat, of a valve rotatably mounted on said seat, there being openings in said valve seat, depressions in said valve to register with said openings to control the passage of fluid therethrough, a packing secured to the face of said valve to engage the valve seat, and means for reciprocating said valve to liberate the same from its valve seat preparatory to rotation thereof.

8. In a valve, the combination with a casing having a conical valve seat, of a conical valve rotatably mounted on said seat, there being openings in said valve seat, depressions in the conical face of said valve to register with said openings to control the passage of fluid therethrough, a packing secured to the face of said valve to engage the valve seat, and means for reciprocating said valve to liberate the same from its valve seat preparatory to rotation thereof.

9. In a valve, the combination with a housing having a mixing chamber, of a valve seat in said housing, a valve rotatably mounted on said valve seat and controlling the passage of fluid to said mixing chamber, a spindle rotatably mounted in said housing and operatively connected to said valve to rotate the same but permit axial movement of said valve relative to said spindle, a handle operatively connected to said spindle and to said valve to raise said valve from its valve seat and thereupon rotate said spindle in turn to cause said valve to be rotated, and a spring compressed between said spindle and valve normally to maintain said valve in engagement with said valve seat.

10. In a valve, the combination with a housing having a mixing chamber, of a valve seat in said housing, a valve rotatably mounted on said valve seat and controlling the passage of fluid to said mixing chamber, a spindle rotatably mounted in said housing and operatively connected to said valve to rotate the same but permit axial movement of said valve relative to said spindle, a handle, cam faces and stops appurtenant to said spindle, cam lugs on said handle cooperating with said cam faces to raise said valve from its valve seat at one time and at another time cooperating with said stops to rotate said spindle to cause said valve to be rotated, and a spring compressed between said spindle and valve normally to maintain said valve in engagement with said valve seat.

11. In a valve, the combination with a casing having plurality of outlets, of an inner wall member forming a conical valve seat and also forming lower outflow chambers to said outlets and also forming a mixing chamber, there being an upper outflow chamber, there being a plurality of inlets in said casing extending into said valve seat, there being openings from said upper outflow chamber to said lower outflow chambers, a conical inlet control valve rotatably mounted on said conical valve seat to control the passage of fluid from said inlets to said mixing chamber, a volume control valve for controlling the passage of fluid from said mixing chamber to said upper outflow chamber, an arcuate valve rotatably mounted to control the openings from said upper outflow chamber to said lower outflow chambers, a spindle rotatably mounted, lugs on said spindle extending downwardly, lugs on said inlet control valve extending upwardly and engaging said downwardly extending lugs whereby rotation of said spindle will be transmitted to said valve and the valve be free to reciprocate axially relative to said spindle, said spindle being operatively connected to said arcuate valve so that rotation of said spindle will be transmitted to said arcuate valve, and a handle operatively connected to said spindle and inlet control valve so as to reciprocate said inlet control valve axially at one time and at another time rotate said spindle in turn to rotate said inlet control valve and said arcuate valve.

12. In a valve, the combination with a casing having a plurality of outlets, of an inner wall member forming a conical valve seat and also forming lower outflow chambers to said outlets and also forming a mixing chamber, there being an upper outflow chamber, there being a plurality of inlets in said casing extending into said valve seat, there being openings from said upper outflow chamber to said lower outflow chambers, a conical inlet control valve rotatably mounted on said conical valve seat to control the passage of fluid from said inlets to said mixing chamber, a volume control valve for controlling the passage of fluid from said mixing chamber to said upper outflow chamber, an arcuate valve rotatably mounted to control the openings from said upper outflow chamber to said lower outflow chambers, a hollow spindle rotatably mounted, lugs on said spindle extending downwardly, lugs on said inlet control valve extending upwardly and engaging said downwardly extending lugs whereby rotation of said spindle will be transmitted to said valve and the valve be free to reciprocate axially relative to said spindle, said spindle being operatively connected to said arcuate valve so that rotation of said spindle will be transmitted to said arcuate valve, a rod extending through said hollow spindle and inlet control valve and operatively connected to said inlet control valve by said volume control valve, and a handle operatively connected to said spindle and rod to reciprocate said rod at one time to liberate said inlet control valve from its valve seat and at another time to rotate said spindle in turn to rotate said inlet control valve and said arcuate valve.

13. In a valve device, a casing having a pair of compartments connected by a passage, the lateral wall of said passage having ports therein, said casing having conduit connections leading to said ports and separate from said compartments, said casing also having a pair of other conduit connections with conduit passages leading to one of said compartments, a valve element in said casing passage and cooperating with said ports to control communication between said ports and the other of said compartments, selectively depending upon the angular adjustment of said valve element, means also operated by said valve element for controlling communication between said one of the compartments and said second pair of conduit connections, said valve element having a channel therethrough establishing communication between said compartments, whereby when the valve element is operated in one direction to establish communication between one of the ports and said other compartment, communication will be established between that port and one of the said other conduit connections, depending upon the angular direction in which the valve element is operated, said means operated by the valve element for controlling communication between the compartments and the second ports being so related and connected to the valve element that direct communication between said second pair of conduit connections will be established when the valve element is in "off" position where said ports are closed.

BENJAMIN ROSENBAUM.